US011196715B2

(12) United States Patent
Varma et al.

(10) Patent No.: US 11,196,715 B2
(45) Date of Patent: Dec. 7, 2021

(54) SLICE-AGGREGATED CRYPTOGRAPHIC SYSTEM AND METHOD

(71) Applicant: XILINX, INC., San Jose, CA (US)

(72) Inventors: Anujan Varma, Cupertino, CA (US); Poching Sun, San Jose, CA (US); Chuan Cheng Pan, San Jose, CA (US); Suchithra Ravi, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 212 days.

(21) Appl. No.: 16/513,218

(22) Filed: Jul. 16, 2019

(65) Prior Publication Data

US 2021/0021575 A1    Jan. 21, 2021

(51) Int. Cl.
*H04L 29/06*   (2006.01)
*G06F 1/3287*   (2019.01)
*G06F 21/60*   (2013.01)
*G06F 21/64*   (2013.01)

(52) U.S. Cl.
CPC ........ *H04L 63/0428* (2013.01); *G06F 1/3287* (2013.01); *G06F 21/602* (2013.01); *G06F 21/64* (2013.01)

(58) Field of Classification Search
CPC ........ G06F 21/64; G06F 21/602; G06F 21/76; G06F 1/3287; G06F 30/34; H04L 63/0428; H04L 9/14
USPC ........................................................ 713/153
See application file for complete search history.

(56) References Cited

U.S. PATENT DOCUMENTS 8,595,479 B2 * 11/2013 Radhakrishnan ... H04L 63/0272
713/153
8,631,244 B1 * 1/2014 Potts .................. H04L 63/1441
713/188
9,059,853 B1 * 6/2015 Bortz ................. H04L 67/2809
9,531,503 B2 * 12/2016 Katz .................. H04L 63/0272
9,942,148 B1 * 4/2018 Sivaramakrishnan .. H04L 45/72
10,230,698 B2 * 3/2019 Wakumoto ......... H04L 63/0485

(Continued)

OTHER PUBLICATIONS

Swankoski, E.J., et al., "A parallel architecture for secure FPGA symmetric encryption". Proceedings—18th International Parallel and Distributed Processing Symposium, IPDPS 2004, Apr. 26-30, 2004, Sante Fe, NM, Jan. 1, 2004, pp. 132-139, XP055727757.

*Primary Examiner* — Amare F Tabor (74) *Attorney, Agent, or Firm* — Patterson + Sheridan, LLP (57) ABSTRACT

A system comprises one or more slice-aggregated cryptographic slices each configured to perform a plurality of operations on an incoming data transfer at a first processing rate by aggregating one or more individual cryptographic slices each configured to perform the plurality of operations on a portion of the incoming data transfer at a second processing rate. Each of the individual cryptographic slices comprises in a serial connection an ingress block configured to take the portion of the incoming data transfer at the second processing rate, a cryptographic engine configured to perform the operations on the portion of the incoming data transfer, an egress block configured to process a signature of the portion and output the portion of the incoming data transfer once the operations have completed. The first processing rate of each slice-aggregated cryptographic slices equals aggregated second processing rates of the individual cryptographic slices in the slice-aggregated cryptographic slice.

22 Claims, 7 Drawing Sheets

(56) References Cited

U.S. PATENT DOCUMENTS

| | | | |
|---|---|---|---|
| 10,375,034 B2* | 8/2019 | Eldridge | H04L 63/0435 |
| 10,439,929 B2* | 10/2019 | Bhattacharya | H04L 45/28 |
| 10,616,108 B2* | 4/2020 | Josyula | H04L 45/66 |
| 2003/0023846 A1* | 1/2003 | Krishna | G06F 21/72 |
| | | | 713/162 |
| 2004/0077345 A1* | 4/2004 | Turner | H04W 28/06 |
| | | | 455/423 |
| 2008/0130894 A1* | 6/2008 | Qj | H04L 63/0485 |
| | | | 380/277 |
| 2008/0247539 A1* | 10/2008 | Huang | H04L 9/0833 |
| | | | 380/28 |
| 2009/0150708 A1 | 6/2009 | Kim et al. | |
| 2010/0217971 A1 | 8/2010 | Radhakrishnan et al. | |

\* cited by examiner

SLICE-AGGREGATED CRYPTOGRAPHIC SYSTEM AND METHOD

TECHNICAL FIELD

The disclosure generally relates to cryptographic system for protection of data transfer over communication networks, and systems and circuits implementing the proposed slice-aggregated cryptographic system.

BACKGROUND

In the current era of big data, quintillion bytes of data are created from edge devices and uploaded to storages and/or servers in the cloud every day. The edge devices providing entry points into enterprises or service providers' core networks can include, for non-limiting examples, routers, switches, multiplexers, and a variety of network access devices. For data protection, cryptography is often used in networking and storage of such data to make sure that the data is transmitted from the edge device and stored in the cloud securely. Different edge devices may need different processing rates.

For a non-limiting example, a 400G (or gbps) cryptographic engine is configured to encrypt and decrypt a data transfer at processing rate of 100 gbps (i.e., billions of bits per second), 200 gbps, and 400 gbps. An exemplary cryptographic system comprising four 100G cryptographic engines, two 200G cryptographic engines, and one 400G engine then picks one or more of the cryptographic engines based on the required processing rate of each data transfer. For non-limiting examples:

4×100G cryptographic engines for four 100 gbps data transfers, or

2×200G cryptographic engines for two 200 gbps data transfers, or

1×400G cryptographic engine for one 400 gbps data transfers, or

1×200G cryptographic engine and 2×100 cryptographic engines for one 200 gbps data transfer and two 100 gbps data transfers.

Such cryptographic system however, is extremely costly because of redundant cryptographic engines being included in the cryptographic system.

Another conventional approach is to use time division multiplexing (TDM) on one single, e.g., 400G, cryptographic engine with ingress and egress buffers for each data transfer. The configurability is achieved by rearranging these additional ingress and egress buffers with some overhead mechanisms to switch data transfers among the buffers based on the required processing rates. However, this approach has cost and latency penalty because of the additional ingress and egress buffers, the lack of physical isolation, and power gating due to the sharing one single cryptographic engine.

SUMMARY

Accordingly, a need has arisen for a high-speed and configurable cryptographic system. A new cryptographic system is proposed where the cryptographic system includes a plurality of low processing rate (e.g., 100G) slices. Each slice may be configured to perform cryptographic operations on a data transfer at certain processing rate. The cryptographic system allows various aggregation/configuration among the plurality of low-rate processing slices to form processing units at various higher processing rates for integrity and/or confidentiality of data encryption/decryption. Such slice-aggregated cryptographic system achieves cost efficiency by adopting reusable and configurable components/slices, power efficiency by turning on only the slices that are needed for the current data transfer task, and secured design for data integrity since the slices used for the data transfer are physical isolated.

A system comprises one or more slice-aggregated cryptographic slices where each slice may be configured to perform a plurality of operations on an incoming data transfer at a first processing rate by aggregating one or more individual cryptographic slices where each slice may be configured to perform the plurality of operations on a portion of the incoming data transfer at a second processing rate. Each of the individual cryptographic slices comprises in a serial connection an ingress block configured to take the portion of the incoming data transfer at the second processing rate, a cryptographic engine configured to perform the operations on the portion of the incoming data transfer, an egress block configured to insert or remove a signature of the portion of the incoming data transfer and output the portion of the incoming data transfer once the operations have completed. The first processing rate of each slice-aggregated cryptographic slices equals aggregated second processing rates of the individual cryptographic slices in the slice-aggregated cryptographic slice.

It is appreciated that the plurality of operations is one or more of generating or checking the signature of the data transfer for integrity and encrypting or decrypting the data transfer for confidentiality. The portion of the incoming data transfer processed on one slice-aggregated cryptographic slice is physically isolated from the portions of the incoming data transfer processed on others slice-aggregated cryptographic slices. In some embodiments, the system further comprises one or more cross-slice channels among the slice-aggregated cryptographic slices, wherein each of the one or more cross-slice channels is configured to propagate information generated from one slice-aggregated cryptographic slice to another slice-aggregated cryptographic slice to achieve slice aggregation. In some embodiments, each of the one or more cross-slice channels is further configured to broadcast commonly-used information to all individual cryptographic slices within a slice-aggregated cryptographic slice so that per-slice resources are cascaded, shared, and operated together among the individual cryptographic slices based on configuration of the slice-aggregated cryptographic slice.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Examples described herein relate to efficient and configurable slice-aggregated cryptographic system. Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

The slice-aggregated cryptographic system described hereinafter uses a non-limiting example of four 100G cryptographic engines (a.k.a. slice) to illustrate the proposed approach to aggregate each slice based on the required processing rates. For non-limiting examples, the system is configured to aggregate two 100G cryptographic slices into one aggregated 200G cryptographic slice, or four 100G cryptographic slices into one aggregated 400G cryptographic slice. The system has no redundant slice for cost efficiency and provides per-slice controllability for power efficiency. The system also achieves physical isolation on each aggregated slice for data security. Although a four-slice cryptographic system is used as a non-limiting example to illustrate the proposed approach, same approach is also applicable to cryptographic systems having various number of cryptographic engines at varying data processing rates.

Referring now to FIGS. 1-4, which are block diagrams depicting examples of configurable slice-aggregated cryptographic systems for performing cryptographic operations on data transfers at various processing rates are shown.

Figure 1:
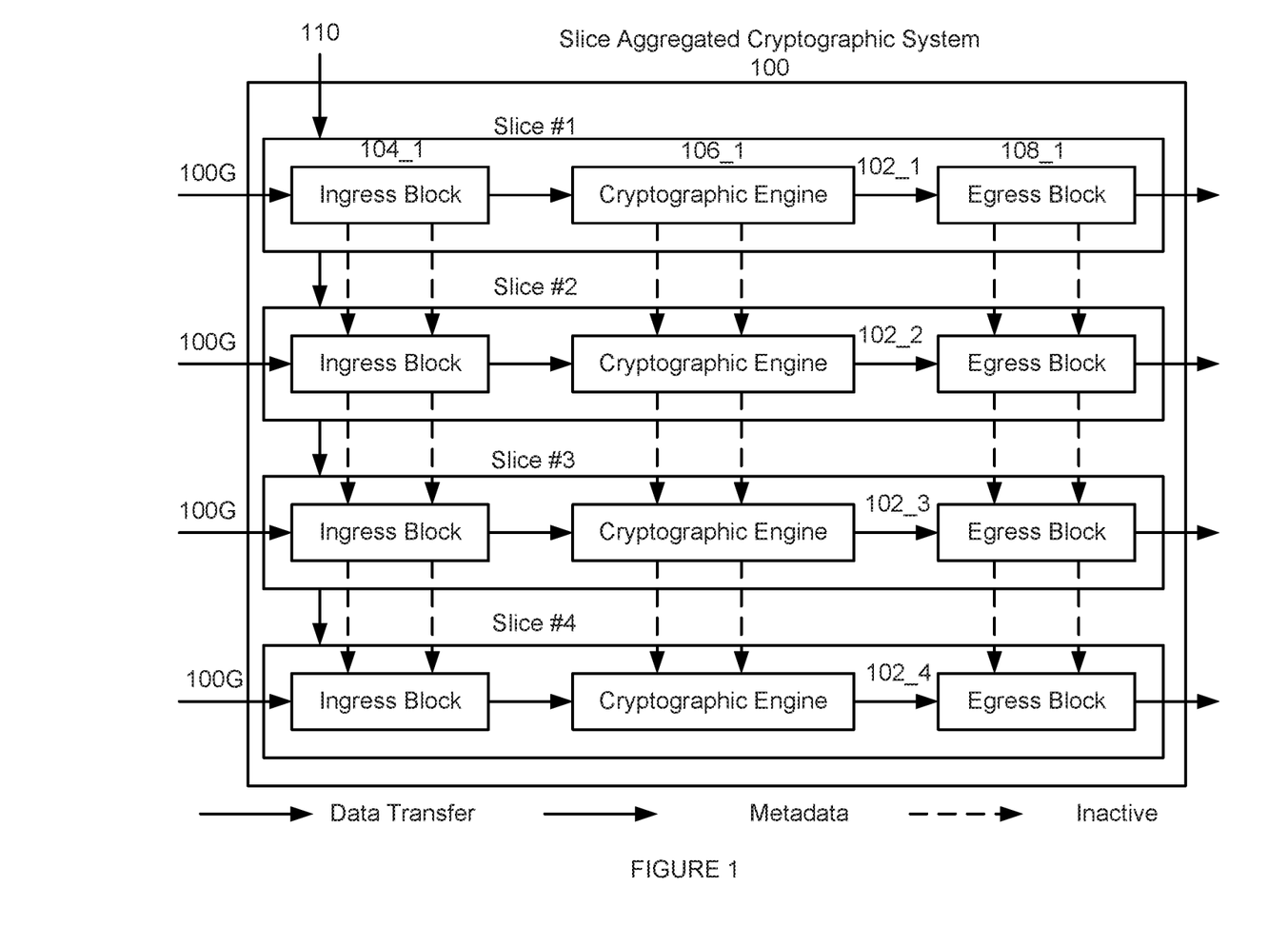
FIG. 1 depicts an example of an architecture of a slice-aggregated cryptographic system comprising a plurality of individual cryptographic slices, according to some examples.

FIG. 1 depicts an example of an architecture of a slice-aggregated cryptographic system 100. The slice-aggregated cryptographic system 100 comprises a plurality of individual cryptographic slices 102_1, . . . , 102_4, e.g., Slice #1 to Slice #4 as shown in FIG. 1. It is appreciated that each individual cryptographic slice 102 may be configured to process an incoming data transfer at 100G or 100 gbps. As shown in FIG. 1, each cryptographic slice 102 includes at least the following components in a chain: an ingress block 104, which is in a serial connection with a cryptographic engine 106, which is in a serial connection an egress block 108. The ingress block 104 is configured to take an incoming data transfer at a certain processing rate, e.g., 100G, inform the cryptographic engine 106 of processing (e.g., cryptographic operations) needed for the data transfer, and feed the data into the cryptographic engine 106 accordingly for such processing. Upon receiving the data from the ingress block 104, the cryptographic engine 106 is configured to perform one or more cryptographic processing and/or operations on the data. The cryptographic operations include but are not limited to generating or checking a signature of the data transfer for integrity and/or encrypting or decrypting the data for confidentiality. Once the cryptographic operations are completed by the cryptographic engine 106, the egress block 108 is configured to insert or remove a signature of the data transfer and transmit the encrypted or decrypted data for further processing or transmission.

Figure 2:
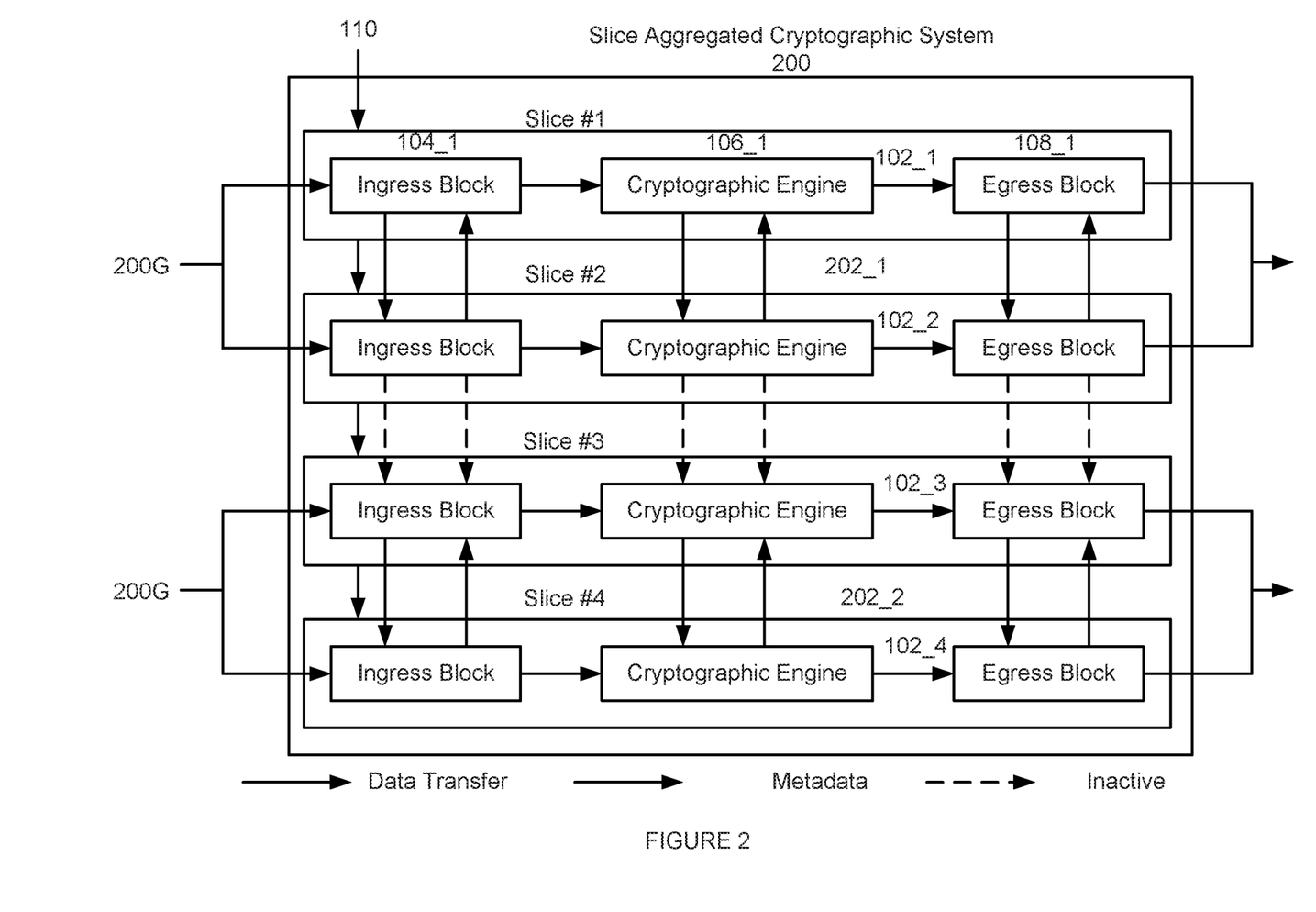
FIG. 2 depicts an example of an architecture of a slice-aggregated cryptographic system comprising two slice-aggregated cryptographic slices each having two individual 100G cryptographic slices, respectively, according to some examples.

In some embodiments, a slice-aggregated cryptographic system is configured to aggregate multiple individual cryptographic slices 102s into one slice-aggregated cryptographic slice to meet the required processing rate of an incoming data transfer. FIG. 2 depicts an example of an architecture of a slice-aggregated cryptographic system 200. The slice-aggregated cryptographic system 200 comprises two slice-aggregated cryptographic slices 202_1 and 202_2, each comprising two individual 100G cryptographic slices 102_1/102_2 and 102_3/102_4, respectively. As a result, each 2-slice-aggregated cryptographic slice 202 is configured to process an incoming data transfer at 200G or 200 gbps, i.e., aggregated processing rates of the two individual cryptographic slices 102s in the slice-aggregated cryptographic slice 202. When a data transfer at 200G is received by the slice-aggregated cryptographic slice 202, the incoming data transfer is split between and fed into the ingress blocks 104s of the two individual cryptographic slices 102s of the slice-aggregated cryptographic slice 202 and processed by components in each of the individual cryptographic slices 102s in parallel as discussed above. Once the two individual cryptographic slices 102s have both completed processing their respective portions of the data transfer, the slice-aggregated cryptographic slice 202 is configured to merge output from the egress blocks 108s of its two individual cryptographic slices 102s into one data output for further transfer and/or processing.

Figure 3:
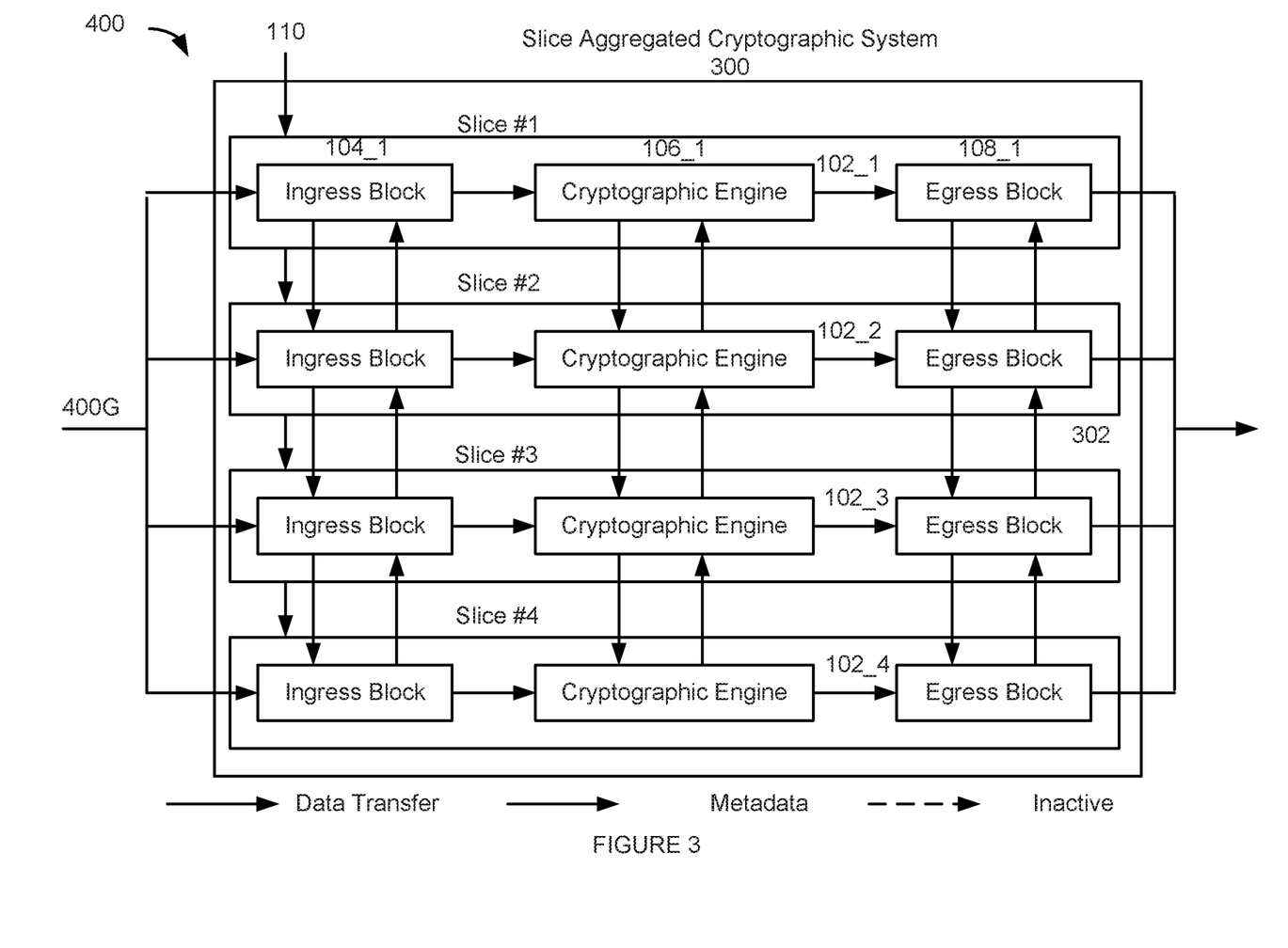
FIG. 3 depicts an example of an architecture of a slice-aggregated cryptographic system comprising one slice-aggregated cryptographic slice having four individual 100G cryptographic slices, according to some examples.

FIG. 3 depicts an example of an architecture of a slice-aggregated cryptographic system 400. The slice-aggregated cryptographic system 400 comprises one slice-aggregated cryptographic slice 302 comprising four individual 100G cryptographic slices 102_1, . . . , 102_4. As a result, the 4-slice-aggregated cryptographic slice 302 is configured to process an incoming data transfer at 400G or 400 gbps, i.e., the aggregated processing rate of the four individual cryptographic slices 102s in the slice-aggregated cryptographic slice 302. When a data transfer at 400G is received by the slice-aggregated cryptographic slice 302, the incoming data is split among and fed into the ingress blocks 104*s* of the four individual cryptographic slices 102*s* of the slice-aggregated cryptographic slice 302 and processed by components in each of the individual cryptographic slices 102*s* in parallel, as discussed above. Once all four individual cryptographic slices 102*s* have completed processing their respective data, the slice-aggregated cryptographic slice 302 is configured to merge output from the egress blocks 108*s* of its four individual cryptographic slices 102*s* into one data output for further transfer and/or processing.

Figure 4:
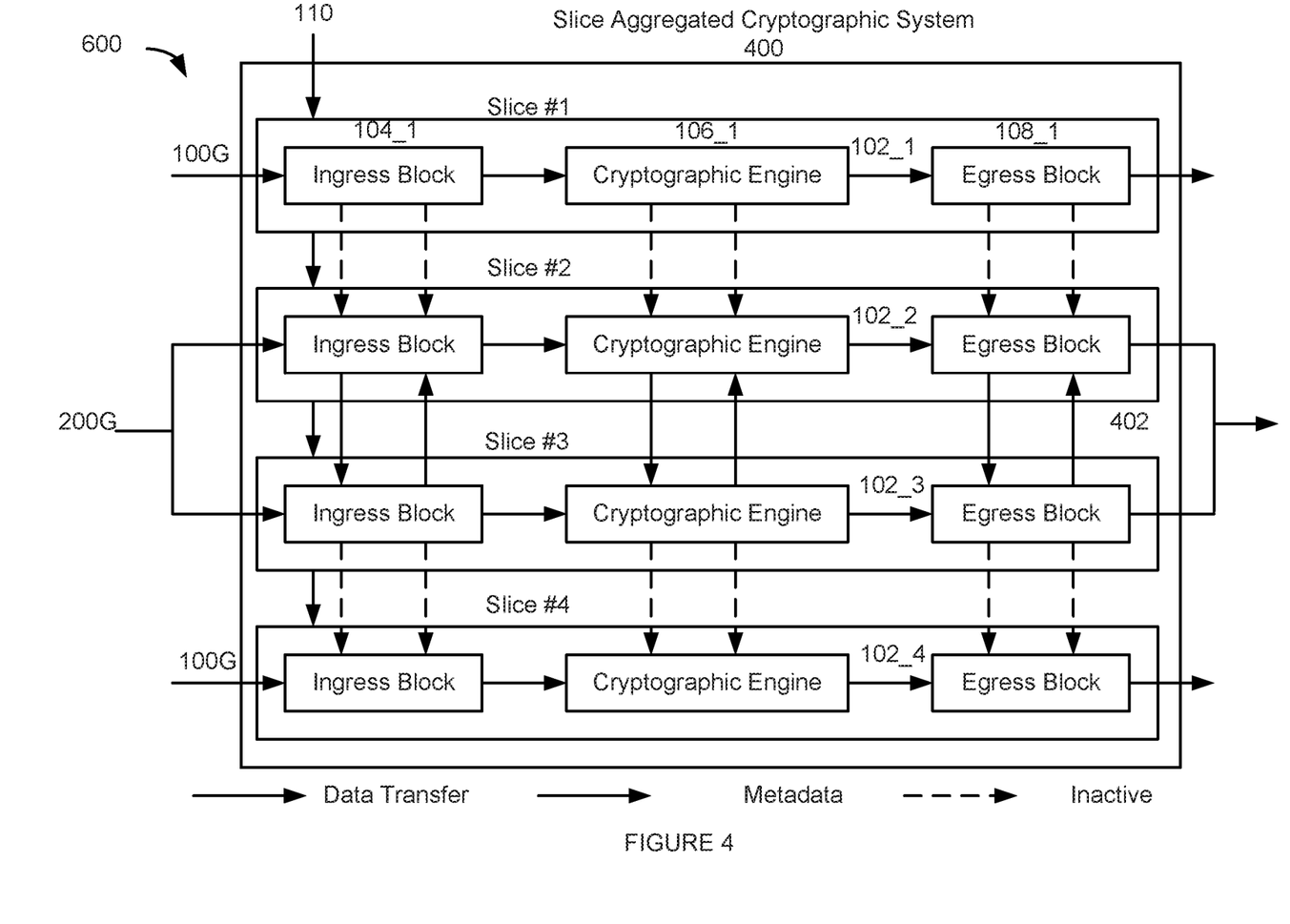
FIG. 4 depicts an example of an architecture of a hybrid slice-aggregated cryptographic system comprising one individual 100G cryptographic slice, one 2-slice-aggregated cryptographic slice comprising two individual 100G cryptographic slices, and one powered off individual 100G cryptographic slice, according to some examples.

In some embodiments, a slice-aggregated cryptographic system is configured to include a mix of both one or more individual cryptographic slices 102*s* as well as one or more slice-aggregated cryptographic slices in order to accommodate multiple data transfers at different processing rates. FIG. 4 depicts an example of an architecture of a hybrid slice-aggregated cryptographic system 600. The hybrid slice-aggregated cryptographic system 600 includes two individual 100G cryptographic slices 102_1 and 102_4, and one 2-slice-aggregated cryptographic slice 402 that includes two individual 100G cryptographic slices 102_2 and 102_3. Under such configuration, the hybrid slice-aggregated cryptographic system 600 is configured to process multiple incoming data transfers at different required processing rates at the same time, e.g., a first data transfer at 100G via the individual 100G cryptographic slice 102_1 and a second data transfer at 200G via the 2-slice-aggregated cryptographic slice 402 including two individual 100G cryptographic slices 102_2 and 102_3. Note that the individual cryptographic slice 102_4 in the example of FIG. 4 is not used and can be powered off (inactive) for power efficiency as discussed in step 512 of FIG. 5 below.

In some embodiments, each of the slice-aggregated cryptographic systems discussed above further includes one or more cross-slice channels 110 among the individual and/or slice-aggregated cryptographic slices. It is appreciated that each cross-slice channel 110 is configured to propagate generated metadata from one cryptographic slice to another cryptographic slice to achieve slice aggregation. In some embodiments, each cross-slice channel 110 may further be configured to broadcast commonly-used metadata to all individual cryptographic slices within a slice-aggregated cryptographic slice so that per-slice resources can be cascaded, shared, and operated together among the individual cryptographic slices based on the configuration of the slice-aggregated cryptographic slice. Resource-sharing within the slice-aggregated cryptographic slice, as described above, is cost efficient because resources of a low processing rate cryptographic slice can be reused by other cryptographic slices. In addition, since the slice-aggregated cryptographic systems, as discussed above, do not rely on time-division-multiplexing method no matter whether a cryptographic slice is a single cryptographic slice or aggregated with others into a slice-aggregated cryptographic slice, such slice-aggregated cryptographic systems provide better data security because the data portion processed on each cryptographic slice or slice-aggregated cryptographic slice is physically isolated from the data portion processed on others cryptographic slices.

In some embodiments, aggregating a plurality of the individual cryptographic slices into a slice-aggregated cryptographic slice involves sharing/propagating information/metadata among various components of the individual cryptographic slices 102. In some embodiments, where the ingress blocks 104*s* of the individual cryptographic slices 102*s* are finite-state-machine based, relevant information of the ingress blocks 104*s* including but not limited to next state, internal flags, saved data, and statistic counters of the finite-state-machine based ingress blocks 104*s* are propagated from one individual cryptographic slice 102 to the next individual cryptographic slice 102 during aggregation of the individual cryptographic slices 102. In some embodiments, where the cryptographic engines 106*s* are mathematic-logic based, operation results by the cryptographic engines 106*s* including but not limited to XOR results, multiplier results, and other cryptographic-algorithm-specific results of the mathematic-logic based cryptographic engines 106*s* are propagated from one individual cryptographic slice to the next individual cryptographic slice during aggregation of the individual cryptographic slices. In some embodiments, where the egress blocks 108*s* of the individual cryptographic slices are also finite-state-machine based, relevant information of the egress blocks 108*s* are propagated from one individual cryptographic slice to the next individual cryptographic slice in similar ways as the ingress blocks 104*s*. In some embodiments, current data framing information and end results are broadcasted to all individual cryptographic slices 102 for resource sharing. In some embodiments, only a part (e.g., one or more components) of the individual cryptographic slices 102 is aggregated by one of the slice-aggregated cryptographic slices, e.g., only the cryptographic engines 106*s* are aggregated across the individual cryptographic slices 102.

Figure 5:
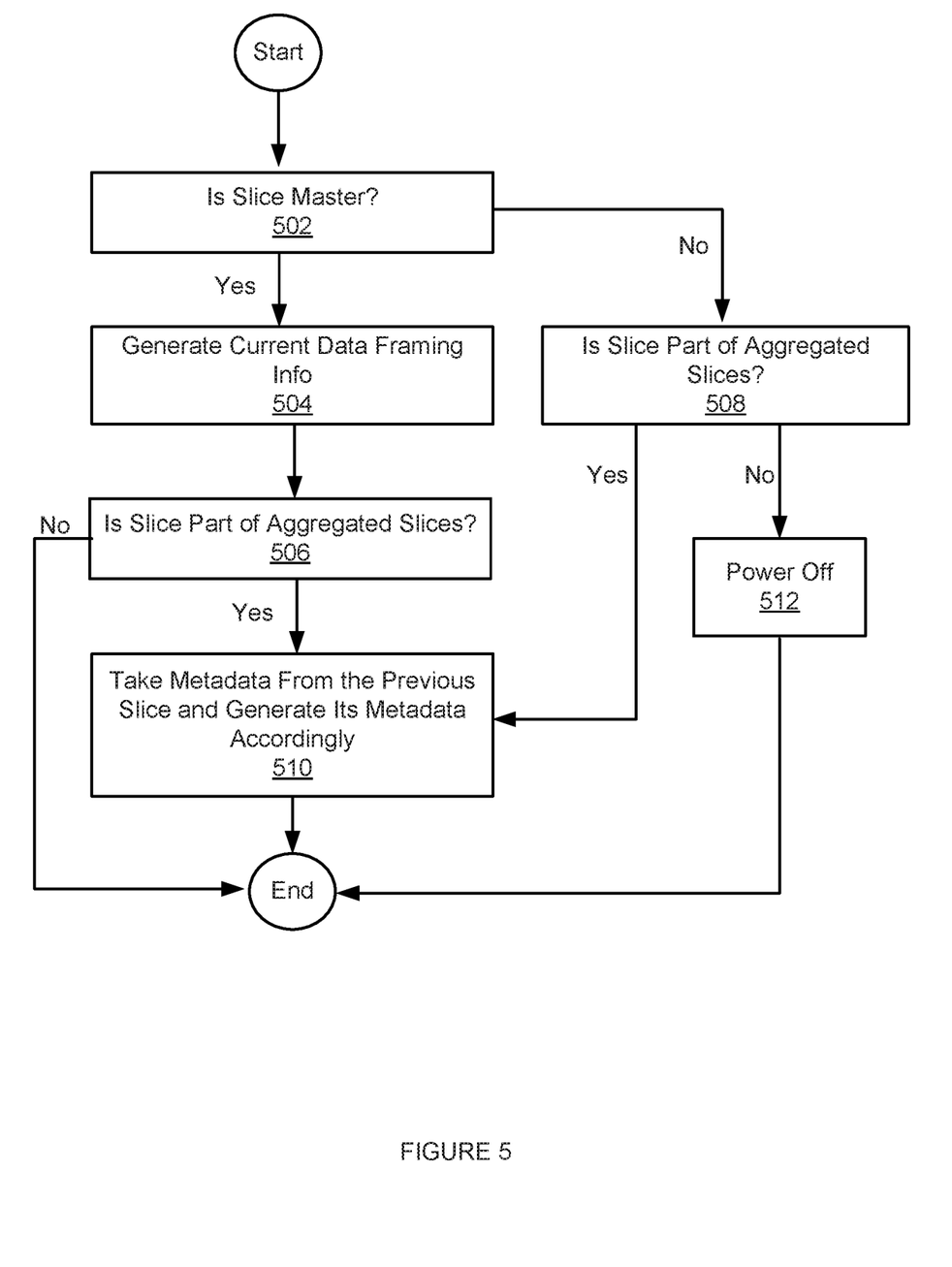
FIG. 5 is a sequence diagram illustrating an example of operations for metadata sharing among cryptographic slices, according to some examples.

In some embodiments, each slice-aggregated cryptographic slice is configured to handle the information/metadata based on configuration of the slice-aggregated cryptographic slice. FIG. 5 is a sequence diagram illustrating an example of operations for metadata sharing among cryptographic slices. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

As shown by the example of FIG. 5, it is first determined at step 502 whether an individual cryptographic slice has been designated as a master slice. If an individual cryptographic slice is a master slice, the master slice is configured to generate current data framing information of the cryptographic slice at step 504. It is then determined at step 506 whether the master slice is the only cryptographic slice or a part of a slice-aggregated cryptographic slice, e.g., cryptographic slice 102_1 in slice-aggregated cryptographic slice 202_1 of FIG. 2, cryptographic slice 102_1 in slice-aggregated cryptographic slice 302 of FIG. 3, and cryptographic slice 102_2 in slice-aggregated cryptographic slice 402 of FIG. 4. If the master slice is the only cryptographic slice, it ignores any incoming information/metadata and not necessarily generate any metadata by itself. Otherwise, if the master slice is determined to be a part of a slice-aggregated cryptographic slice having more than one individual cryptographic slice, even if it is not a master slice (step 508), it takes metadata from the previous individual cryptographic slice in the slice-aggregated cryptographic slice and generate its own metadata accordingly at step 510. A non-master cryptographic slice that is not part of a slice-aggregated cryptographic slice is an invalid configuration, meaning that the individual cryptographic slice is not used and can be powered off for power efficiency at step 512.

Figure 6:
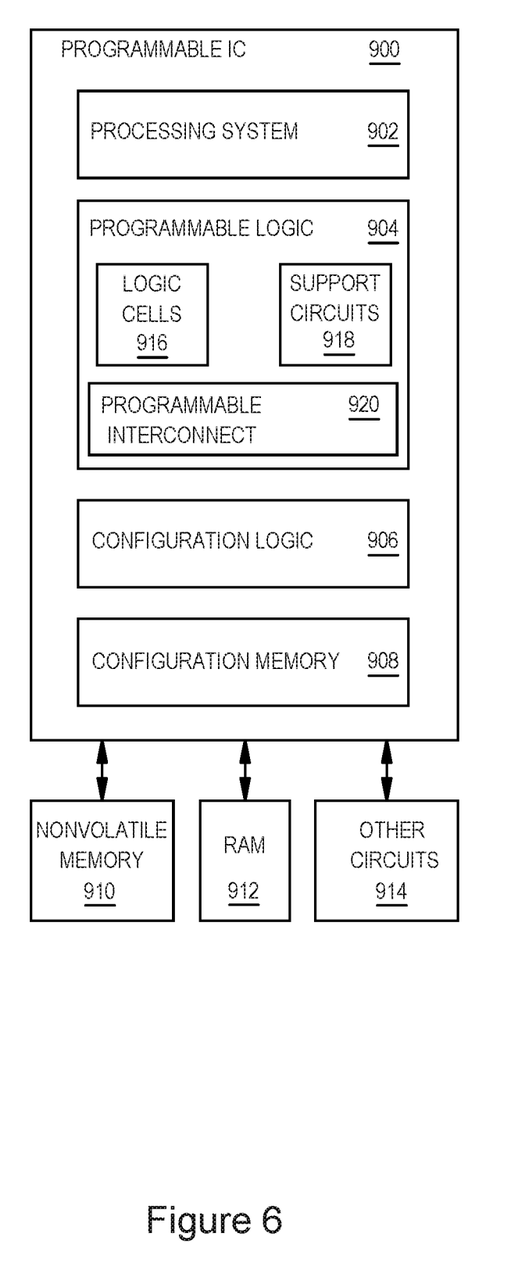
FIG. 6 is a block diagram depicting a programmable integrated circuit (IC), according to some examples.

FIG. 6 is a block diagram depicting a programmable integrated circuit (IC) 900 according to an example. The programmable IC 900 can implement the integrated circuit (IC) chip of systems of FIGS. 1-5, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

The processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 7:
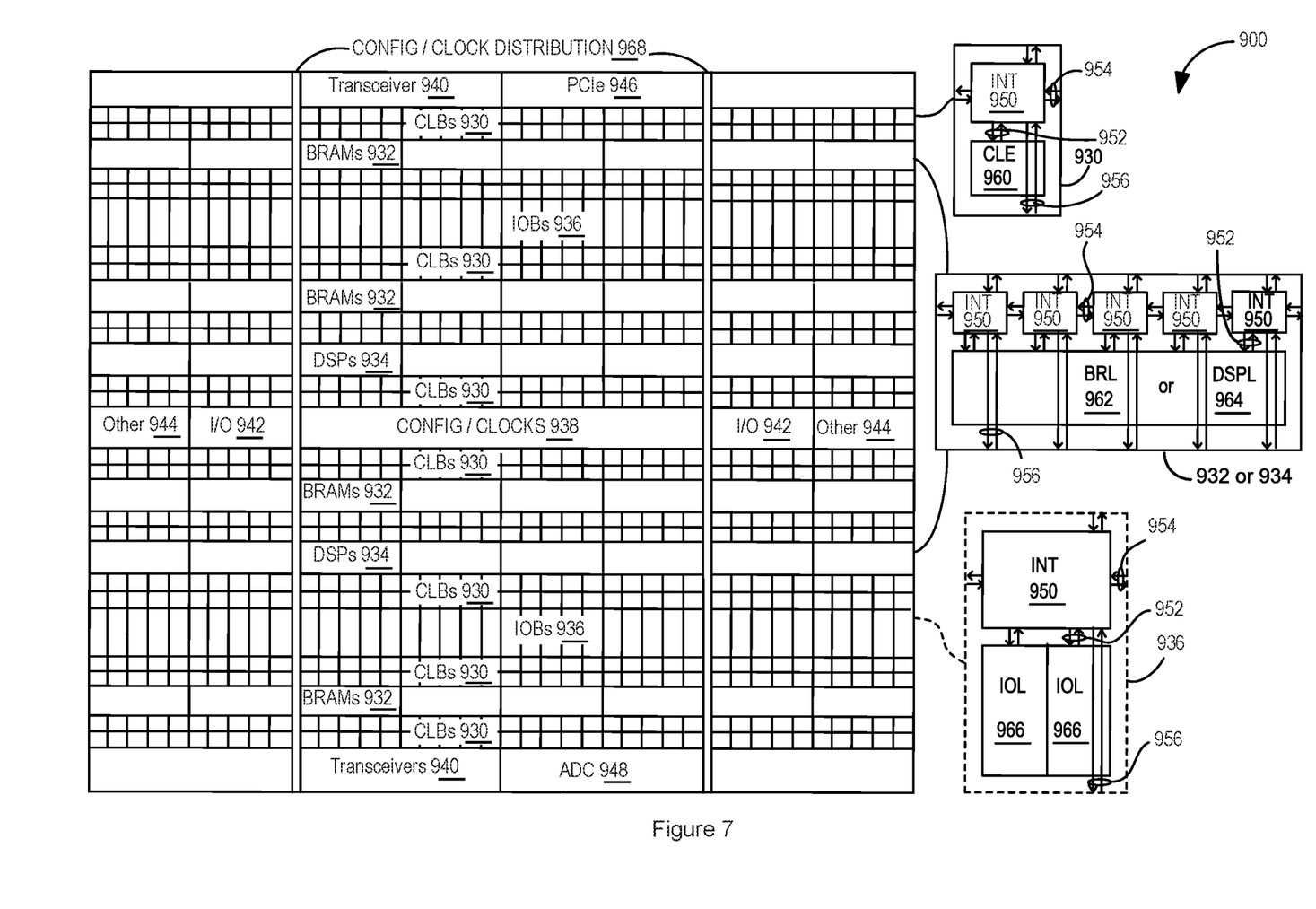
FIG. 7 is a field programmable gate array (FPGA) implementation of the programmable IC, according to some examples.

FIG. 7 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 9. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An IOB 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A system comprising:
one or more slice-aggregated cryptographic slices each configured to perform a plurality of operations on an incoming data transfer at a first processing rate by aggregating one or more individual cryptographic slices, wherein each cryptographic slice of the one or more individual cryptographic slices is configured to perform the plurality of operations on a portion of the incoming data transfer at a second processing rate and comprises at least the following components in a serial connection:
an ingress block configured to take the portion of the incoming data transfer at the second processing rate, inform a cryptographic circuitry of at least one of the plurality the operations needed, and feed the portion of the incoming data transfer to the cryptographic circuitry;
the cryptographic circuitry configured to perform the at least one of the plurality operations on the portion of the incoming data transfer; and
an egress block configured to insert or remove a signature of the portion of the incoming data transfer and output the portion of the incoming data transfer based on the operations completed,
wherein each slice of the one or more slice-aggregated cryptographic slices further is configured to split and feed portions of the incoming data transfer into the ingress blocks of its one or more individual cryptographic slices, and
wherein the first processing rate of each of the one or more slice-aggregated cryptographic slices equals aggregated second processing rates of the one or more individual cryptographic slices of the each one or more slice-aggregated cryptographic slices.

2. The system of claim 1, wherein the plurality of operations is one or more of generating or checking the signature of the data transfer for integrity and encrypting or decrypting the data transfer for confidentiality.

3. The system of claim 1, wherein each slice of the one or more slice-aggregated cryptographic slices is further configured to:
merge outputs from the egress blocks of the one or more individual cryptographic slices into one data output for further transfer and/or processing once the one or more individual cryptographic slices have completed processing their respective portions of the data transfer.

4. The system of claim 3, wherein the portion of the incoming data transfer processed on one slice-aggregated cryptographic slice is physically isolated from the portions of the incoming data transfer processed on others slice-aggregated cryptographic slices.

5. The system of claim 1, wherein at least one of the one or more slice-aggregated cryptographic slices comprises more than one individual cryptographic slices, wherein the first processing rate of the at least one of the one or more slice-aggregated cryptographic slices is higher than the second processing rate of one of the more than one individual cryptographic slices.

6. The system of claim 5, wherein the at least one of the one or more slice-aggregated cryptographic slices comprises only one individual cryptographic slice wherein the one or more slice-aggregated cryptographic slices are configured to perform the plurality of operations on different portions of the incoming data transfer at different processing rates at the same time.

7. The system of claim 1 further comprising:
one or more cross-slice channels among the slice-aggregated cryptographic slices, wherein each cross-slice channel of the one or more cross-slice channels is configured to propagate information generated from one slice-aggregated cryptographic slice of the slice-aggregated cryptographic slices to another slice-aggregated cryptographic slice of the slice-aggregated cryptographic slices to achieve slice aggregation.

8. The system of claim 7, wherein each cross-slice channel of the one or more cross-slice channels is further configured to broadcast commonly-used information to all individual cryptographic slices within a slice-aggregated cryptographic slice of the slice aggregated cryptographic slices, and wherein per-slice resources are cascaded, shared, and operated together among the one or more individual cryptographic slices based on configuration of the slice-aggregated cryptographic slice.

9. The system of claim 1, wherein one of the one or more slice-aggregated cryptographic slices is configured to aggregate only a part of the one or more individual cryptographic slices.

10. The system of claim 1, wherein aggregating the one or more individual cryptographic slices into a slice-aggregated cryptographic slice includes sharing information among the components of the one or more individual cryptographic slices.

11. The system of claim 10, wherein relevant information of the ingress blocks is propagated from one individual cryptographic slice of the one or more individual cryptographic slices to another individual cryptographic slice of the one or more individual cryptographic slices during aggregation of the one or more individual cryptographic slices, and wherein the ingress blocks of the individual cryptographic slices are finite-state-machine based.

12. The system of claim 10, wherein operation results by the cryptographic circuitry are propagated from a first individual cryptographic slice of the one or more individual cryptographic slices to a second individual cryptographic slice of the one or more individual cryptographic slices during aggregation of the one or more individual cryptographic slices, and wherein the cryptographic circuitry are mathematic-logic based.

13. The system of claim 10, wherein relevant information of the egress blocks is propagated from a first individual cryptographic slice of the one or more individual cryptographic slices to a second individual cryptographic slice of the one or more individual cryptographic slices, and wherein the egress blocks of the individual cryptographic slices are finite-state-machine based.

14. The system of claim 10, wherein current data framing information and end results are broadcasted to all of the one or more individual cryptographic slices for resource sharing.

15. The system of claim 10, wherein each slice of the one or more slice-aggregated cryptographic slices is configured to handle and share the information based on configuration of the slice-aggregated cryptographic slice.

16. The system of claim 15, wherein one of the one or more individual cryptographic slices in the slice-aggregated cryptographic slice is configured to take information from a previous individual cryptographic slice of the one or more individual cryptographic slices in the slice-aggregated cryptographic slice and generate its own information accordingly if the previous individual cryptographic slice is determined to be a part of a slice-aggregated cryptographic slice having more than one individual cryptographic slice.

17. The system of claim 15, wherein one of the one or more individual cryptographic slices in the slice-aggregated cryptographic slice is designated as a master slice, wherein the master slice is configured to generate current data framing information of the slice-aggregated cryptographic slice.

18. The system of claim 17, wherein an individual cryptographic slice of the one or more individual cryptographic slices that is not designated as the master slice and is not part of a slice-aggregated cryptographic slice having more than one individual cryptographic slice is powered off for power efficiency.

19. A method comprising:
aggregating one or more individual cryptographic slices into a slice-aggregated cryptographic slice, wherein each aggregated cryptographic slice is configured to perform a plurality of operations on an incoming data transfer at a first processing rate, and wherein each individual cryptographic slice of the one or more individual cryptographic slices comprises at least the following components in a serial connection:
an ingress block configured to take a portion of the incoming data transfer at a second processing rate, inform cryptographic circuitry of at least one of the plurality of operations needed, and feed the portion of the incoming data transfer to the cryptographic circuitry;
the cryptographic circuitry configured to perform the at least one of the plurality of operations on the portion of the incoming data transfer; and
an egress block configured to insert or remove a signature of the portion of the incoming data transfer and output the portion of the incoming data transfer based on the operations completed;
splitting and feeding portions of the incoming data transfer into the ingress blocks of the one or more individual cryptographic slices in the slice-aggregated cryptographic slice, wherein each of the one or more individual cryptographic slices is configured to perform the plurality of operations on a portion of the incoming data transfer at the second processing rate, wherein the first processing rate of the slice-aggregated cryptographic slice equals aggregated second processing rates of the one or more individual cryptographic slices in the slice-aggregated cryptographic slice; and merging output from the egress blocks of the one or more individual cryptographic slices in the slice-aggregated cryptographic slice into one data output for further transfer and/or processing based on the one or more individual cryptographic slices have completed processing their respective portions of the data transfer.

20. The method of claim 19 further comprising:

physically isolating the portion of the incoming data transfer processed on one slice-aggregated cryptographic slice from the portions of the incoming data transfer processed on others slice-aggregated cryptographic slices.

21. The method of claim 19 further comprising:

propagating information generated from one individual cryptographic slice of the one or more individual cryptographic slices to another individual cryptographic slice of the one or more individual cryptographic slices to achieve slice aggregation.

22. The method of claim 19 further comprising:

broadcasting commonly-used information to all of the one or more individual cryptographic slices within the slice-aggregated cryptographic slice, wherein per-slice resources are cascaded, shared, and operated together among the one or more individual cryptographic slices based on configuration of the slice-aggregated cryptographic slice.

* * * * *